United States Patent [19]

Smith et al.

[11] Patent Number: 5,063,811
[45] Date of Patent: Nov. 12, 1991

[54] ACCELERATOR PEDAL ASSEMBLY

[75] Inventors: Ronald A. Smith, Milford; Joseph M. Pace, Livonia, both of Mich.

[73] Assignee: Ford Motor Company, Dearborn, Mich.

[21] Appl. No.: 550,257

[22] Filed: Jul. 9, 1990

[51] Int. Cl.⁵ .................. G05G 1/14; F02D 41/10
[52] U.S. Cl. .................. 74/513; 200/61.89; 338/153
[58] Field of Search ............. 74/513, 482; 200/61.89, 200/86.5; 338/153

[56] References Cited

U.S. PATENT DOCUMENTS

| | | | |
|---|---|---|---|
| 3,388,611 | 6/1968 | Clary et al. | 74/513 |
| 3,630,326 | 12/1971 | Kawaguchi | 192/3 S |
| 3,641,837 | 2/1972 | Dean, Jr. | 74/513 |
| 3,695,379 | 10/1972 | Veilleux | 200/61.89 X |
| 3,857,304 | 12/1974 | Berndt | 74/877 |
| 4,087,776 | 5/1978 | Donato | 74/513 X |
| 4,297,550 | 10/1981 | Leighton | 200/61.89 |
| 4,335,689 | 6/1982 | Abe et al. | 123/339 |
| 4,703,823 | 11/1987 | Yogo et al. | 180/197 |
| 4,718,380 | 1/1988 | Katayose et al. | 123/399 |
| 4,727,838 | 3/1988 | Oshiage et al. | 123/361 |
| 4,802,381 | 2/1989 | Hsin-Hsin | 74/513 |
| 4,831,985 | 5/1989 | Mabee et al. | 123/399 |
| 4,875,385 | 10/1989 | Sitrin | 74/513 X |
| 4,883,037 | 11/1989 | Mabee et al. | 123/399 |
| 4,944,269 | 7/1990 | Imoehl | 74/513 X |
| 4,958,607 | 10/1990 | Lundberg | 74/513 X |
| 4,976,166 | 12/1990 | Davis et al. | 338/153 X |

Primary Examiner—Allan D. Herrmann
Assistant Examiner—Julie Krolikowski
Attorney, Agent, or Firm—Jerome R. Drouillard; Roger L. May

[57] ABSTRACT

An electronic accelerator pedal assembly for vehicles including a base bracket adapted to be secured to the floor pan and having an upper housing fixedly supporting the associated electronic componentry indicating accelerator pedal position, including the output wiring free from the hostile environment zone beneath the accelerator pedal. The accelerator pedal is hingedly connected to the basic bracket member at a lower end and rotatably and slidably coupled to a spring biased follower member at its upper end by a jointly radiating coupling, and the follower member transmits pedal travel to the electronic componentry and includes a stop member for retaining the accelerator pedal in idle position.

11 Claims, 5 Drawing Sheets

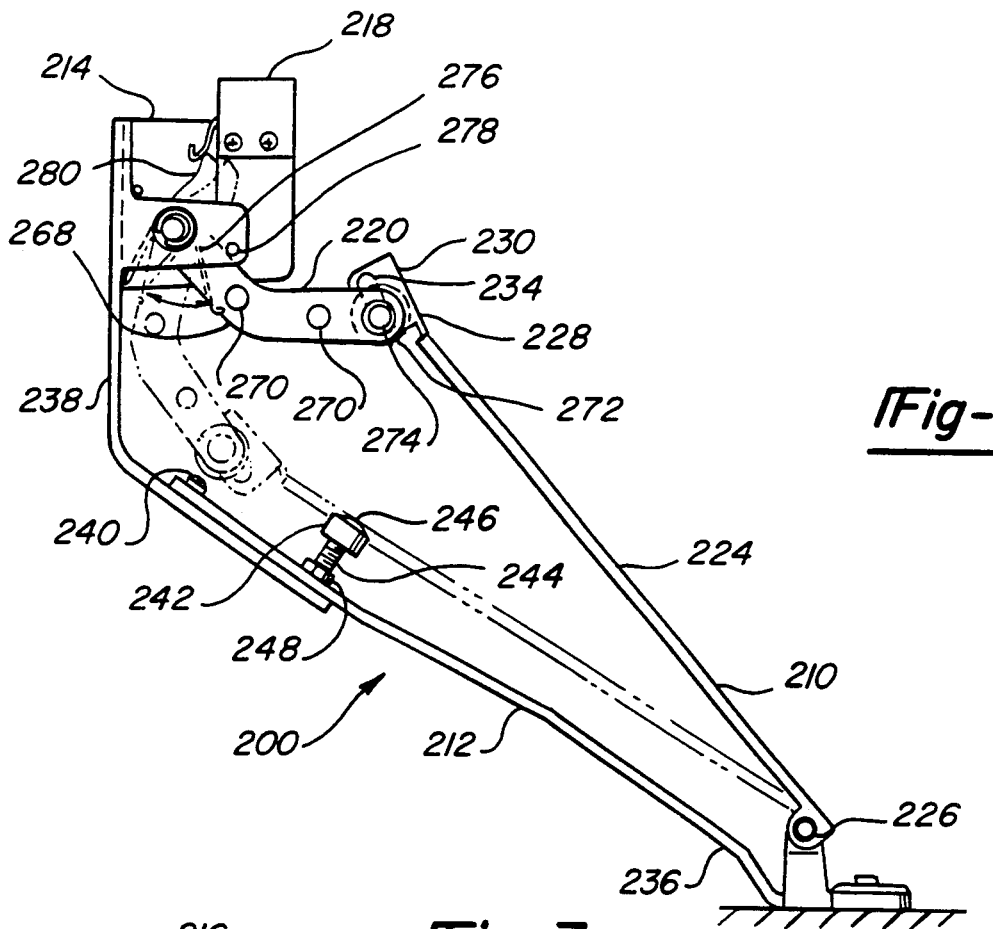
*Fig-6*
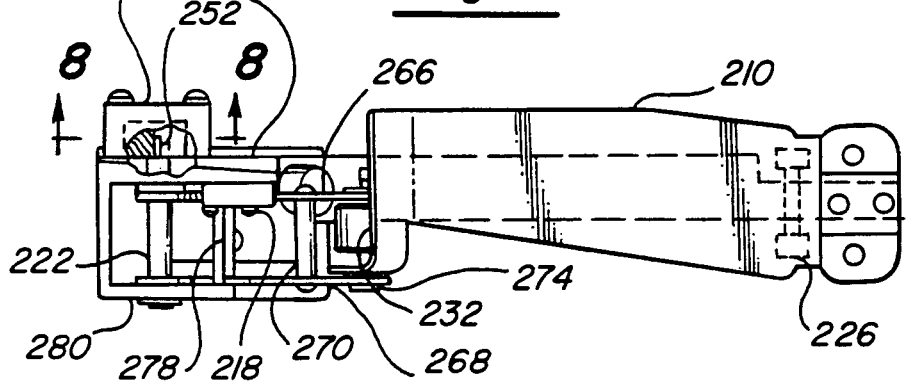
*Fig-7*
*Fig-8*

# ACCELERATOR PEDAL ASSEMBLY

TECHNICAL FIELD

The present invention relates to accelerator pedal assemblies, and more particularly to a floor pan mounted electronic accelerator pedal assembly for vehicles.

BACKGROUND OF THE INVENTION

Until recent years, the conventional accelerator pedal assembly was mechanical in nature in that the position of the accelerator pedal was transferred by mechanical means to the engine throttle control. This mechanical means is usually in the form of mechanical linkages and cables.

More recently, with the advent of fuel injection and more sophisticated and precisely tuned fuel control systems, electronic controls have come into popular use rather than mechanical controls. With this has been the adaptation of the electronic accelerator pedal assemblies which include an electronic device for indicating the pedal position from its idle position to the fully wide open throttle position. Typical of such assemblies are those shown in U.S. Pat. Nos. 4,335,689; 4,718,380; 4,727,838; 4,831,985; and 4,883,037.

However, while such systems may allow more precise control of engine operating parameters, the electronic componentry is more delicate than the predecessor mechanical components, and must be protected by changes in the overall design concept for the accelerator pedal assembly.

Specifically, the wiring to the electrical components must be secure from the possibility of chafing which will eventually result in electrical failure. Thus, the pedal assemblies must not precipitate any motion in the connecting wires themselves, such as shown in the electronic pedal assembly of U.S. Pat. No. 4,883,037. Further, one must take care that the electrical components of the assembly are placed outside of the hostile environment zone lying between the operator's foot or the accelerator pedal and the floor pan of the vehicle. This zone is subjected to the substances the operator may get on his or her shoes such as gas, oil, salt, dirt, acid and the like.

Likewise, there is a need for a pedal assembly designed as a single component which can be easily installed in the vehicle as original equipment or as a replacement for original equipment and one which is itself serviceable in basic modules or component parts.

SUMMARY OF THE INVENTION

The present invention is designed to service the above-mentioned needs.

The present invention contemplates an electronic pedal assembly wherein the electrical components are located outside of the hostile environment zone beneath the accelerator pedal.

The invention further contemplates an electronic accelerator pedal assembly wherein the electrical wiring extending between the electrical components on the pedal assembly to the main wiring harness of the vehicle are not caused to move relative to the vehicle cab during pedal actuation.

The invention further contemplates an electronic accelerator pedal assembly including means establishing a relationship between the rotation of the accelerator pedal and the voltage output of the electrical component indicating pedal position, thereby providing (i) a progressive pedal effort without any momentary increases or decreases in voltage output; and (ii) an assembly which will provide the same amount of fuel for a given pedal input regardless of pedal position.

The invention also contemplates an accelerator pedal assembly which can be installed as a preadjusted complete unit involving minimum installation effort and being completely compatible with or as a replacement for existing pedal assemblies.

Further, the invention contemplates an accelerator pedal assembly having a minimum number of distinctly separate and serviceable units, whereby service work can be performed quickly and conveniently on any one of the units without disturbing the installation of the remaining units.

Also, the invention contemplates providing the accelerator pedal assembly with an optional pedal blade which can interact with mechanical components outside of the vehicle cab. The motion of the blade can operate, or be operated by, the same components as the primary accelerator system.

The above objects and other objects, features, and advantages of the present invention will be readily apparent from the following detailed description of the best mode for carrying out the invention when taken in conjunction with the accompanying drawings.

BRIEF DESCRIPTION OF THE DRAWINGS

FIG. 6 is a side elevation view of the electronic accelerator pedal assembly in accordance with an alternative embodiment of the present invention;

FIG. 7 is a plan view of FIG. 6 showing in partial cross-sectional view the potentiometer input shaft as received within the potentiometer; and FIG. 8 is an exploded expanded view of the potentiometer input shaft and the potentiometer socket member within which it is received, as viewed generally in the direction of lines 8—8 of FIG. 7.

BEST MODE FOR CARRYING OUT THE INVENTION

The electronic accelerator pedal assembly performs the accelerator control function for a vehicle built with an onboard computer requiring pedal position input. This input is used to operate electronically controlled engines, and in some cases, transmissions.

Figure 1:
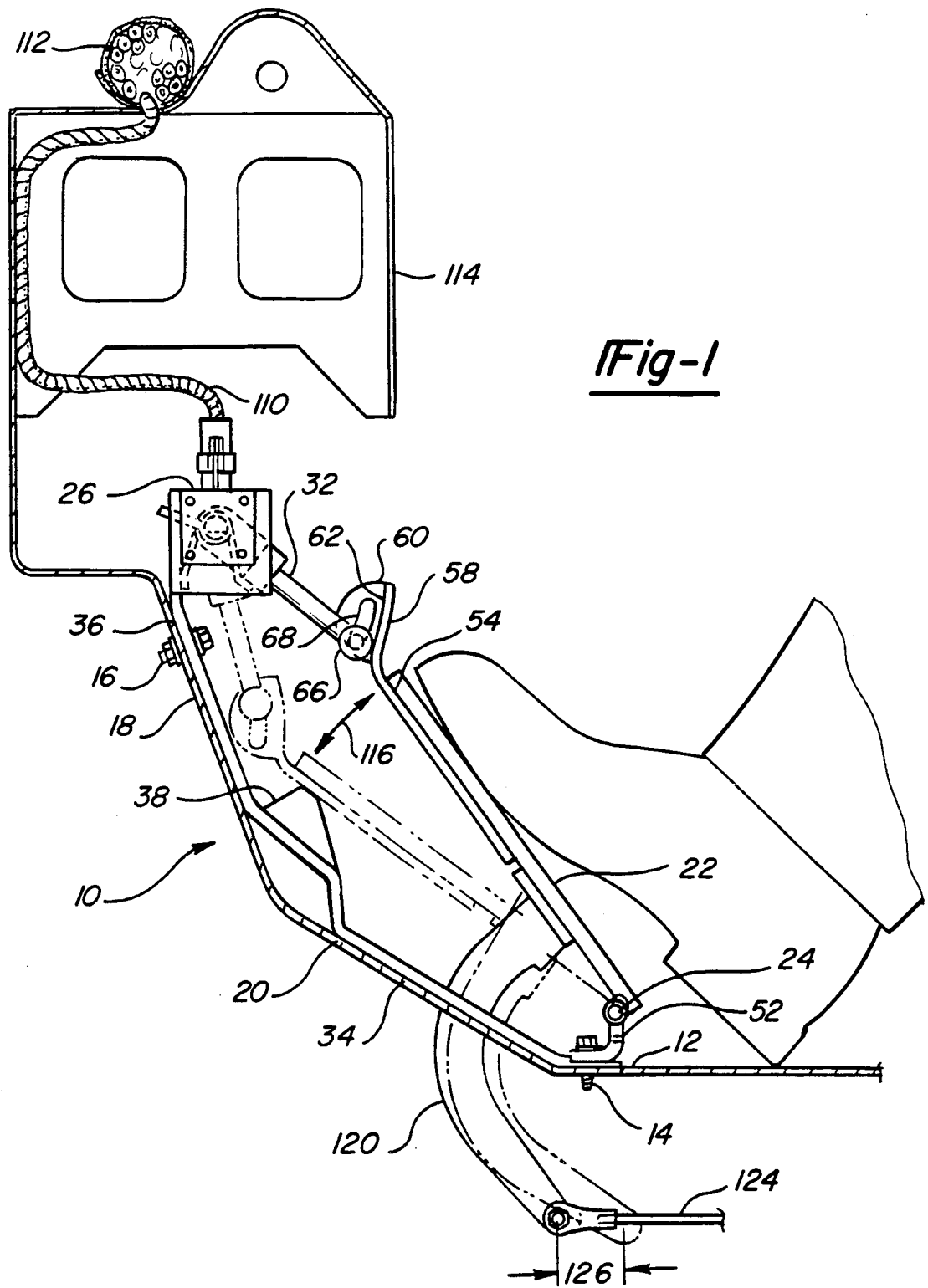
FIG. 1 is a side elevation view of the electronic accelerator pedal assembly in accordance with the present invention.
Figure 2:
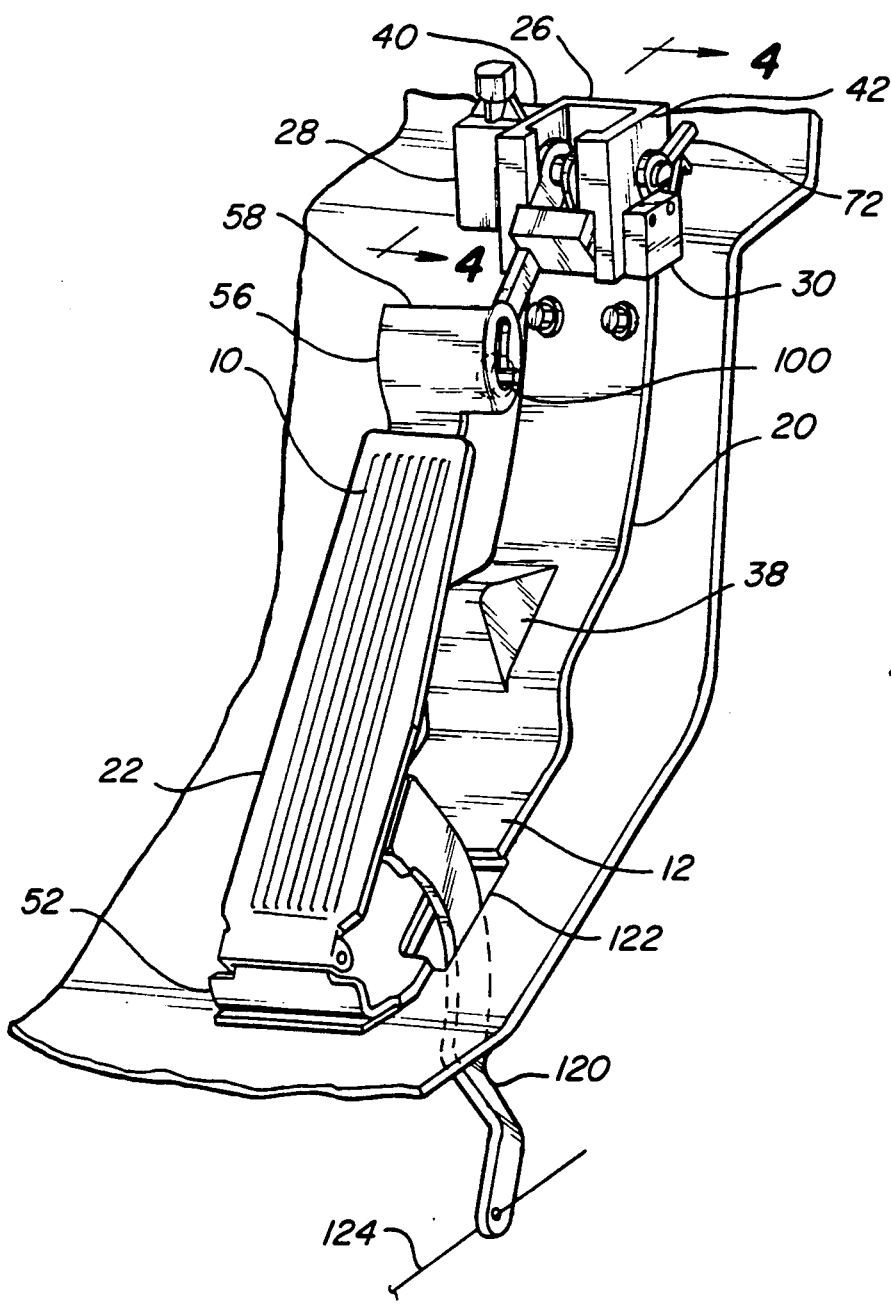
FIG. 2 is a perspective view of the electronic accelerator pedal assembly in accordance with the present invention and showing the same at the idle position.

The assembly as seen in FIGS. 1 and 2 is adapted to mount into the vehicle in place of an existing accelerator pedal or as original equipment. To the driver or operator, it will operate in the same manner as any conventional accelerator pedal assembly, having the same feel and basically functioning in the same manner.

The general assembly of the accelerator pedal assembly within a vehicle cab is best shown in FIGS. 1 and 2. The accelerator pedal assembly, generally designated 10, is adapted to be mounted to the floor of the vehicle cab. The lower portion is mounted to the floor pan 12 by several bolts 14. Likewise, at its upper end, it is secured by several bolts 16 to that part of the floor which is normally referred to as the toe board 18.

The accelerator pedal assembly includes a base bracket member 20, an accelerator pedal 22 hingedly connected by hinge pin 24 to the lower portion of the base bracket member, an upper housing portion 26 which is part of the base bracket member and includes certain electrical components affixed thereto including a potentiometer 28 and an idle validation switch 30, and an oscillating follower member 32 pivotally connected to the free end of the accelerator pedal for translating the motion of the accelerator pedal to the electrical components 28 and 30.

More specifically, it is seen that the base bracket member 20 is in the form of an elongated plate member. It includes a lower portion 34 which is generally horizontal to the floor pan 12, and an upper portion 36 arranged generally vertically. At the midpoint of the base bracket member 20, which is generally at the juncture of the upper and lower portions thereof, there is located a stop member 38 which projects upwardly in the direction of the accelerator pedal 22 and acts as a stop for the accelerator pedal representing the wide-open-throttle position. At the extreme upper end of the base bracket member, the housing portion 26 is formed by two laterally spaced and outwardly projecting walls 40 and 42. Each of the walls include a flange 44,46, respectively, at the free end thereof which is stepped at its lower portion as seen best in FIG. 3 to form a stop shoulder 48,50, respectively, described in detail below.

The accelerator pedal 22 includes a hinge 24 at its lower end allowing it to be fixed to a hinge plate 52 which in turn is affixed to the base bracket member by the same bolt 14 affixing the base bracket member to the floor pan. On the underside of the accelerator pedal, there is secured a flat plate member 54 extending beyond the pedal portion of the accelerator pedal and providing a coupling member 56 for coupling the angular movement of the accelerator pedal with that of oscillating follower member 32 which in turn controls the position of the rotary input shaft 70 received within potentiometer 28.

The coupling member includes a laterally extending plate portion 58 and a flange portion 60 extending therefrom in the direction of the base bracket member 20. The laterally extending portion 58 is curved generally along an axis parallel to that of hinge pin 24. The concave underside thereof provides a cam surface 62 upon which a cam follower in the form of a roller 66 is adapted to ride. The flange 60 includes a generally curved slot 68 to allow a means for fixing the follower 32 to the coupling.

Figure 3:
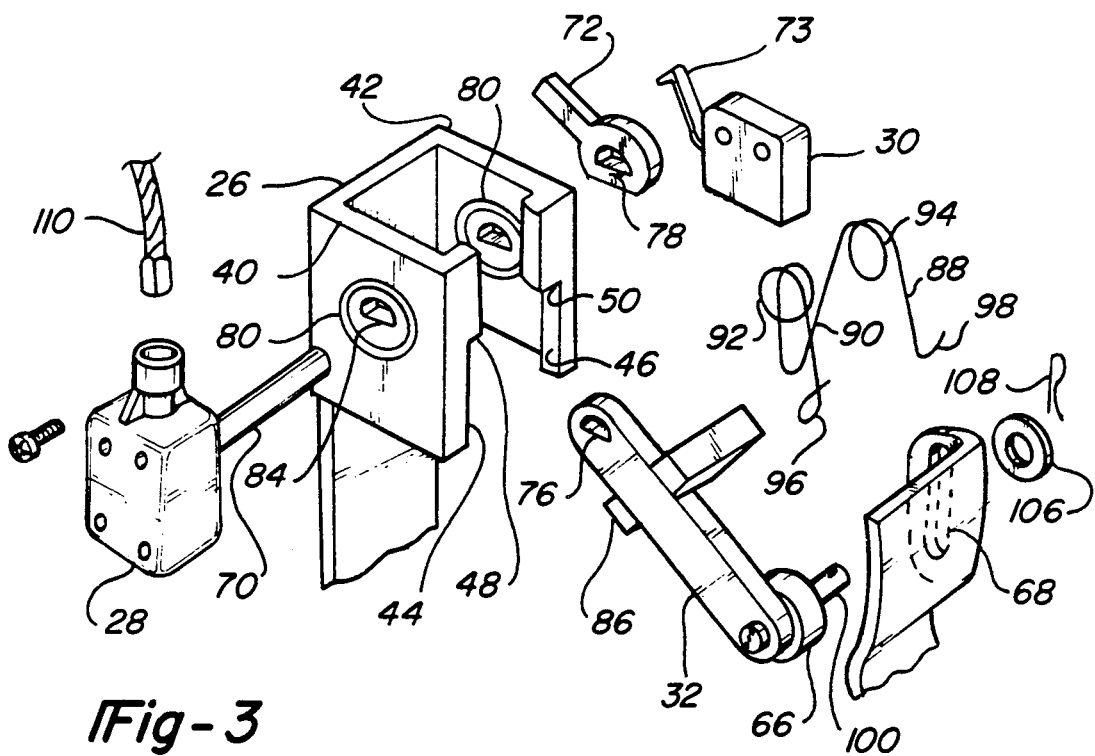
FIG. 3 is an exploded view of the top portion of the accelerator pedal assembly in accordance with the present invention.
Figure 4:
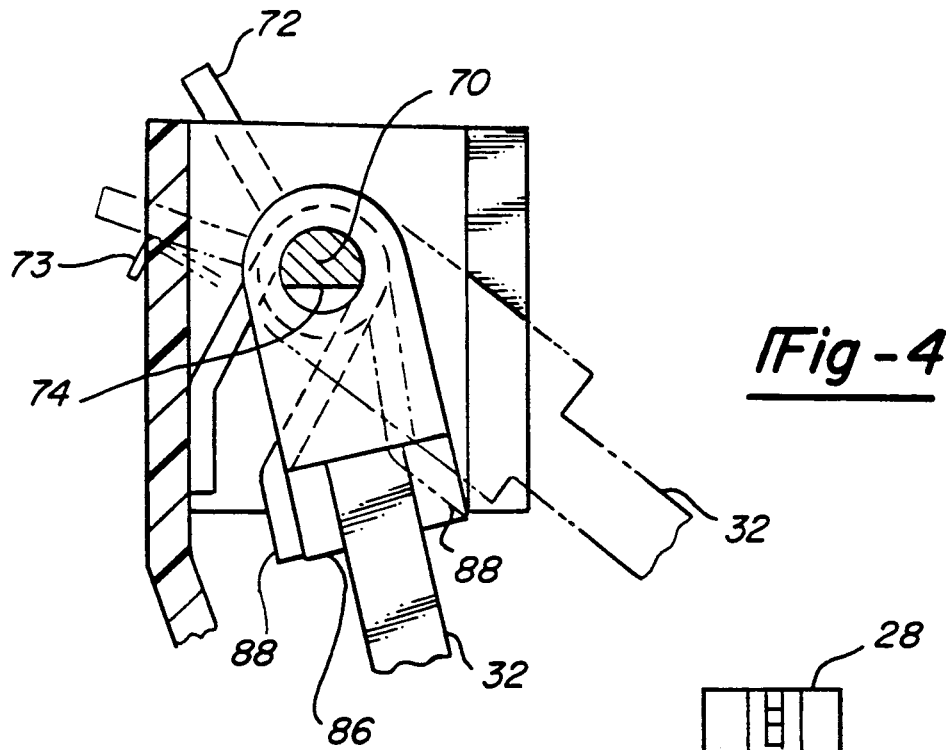
FIG. 4 is a sectional view taken substantially along lines 4—4 of FIG. 2.
Figure 5:
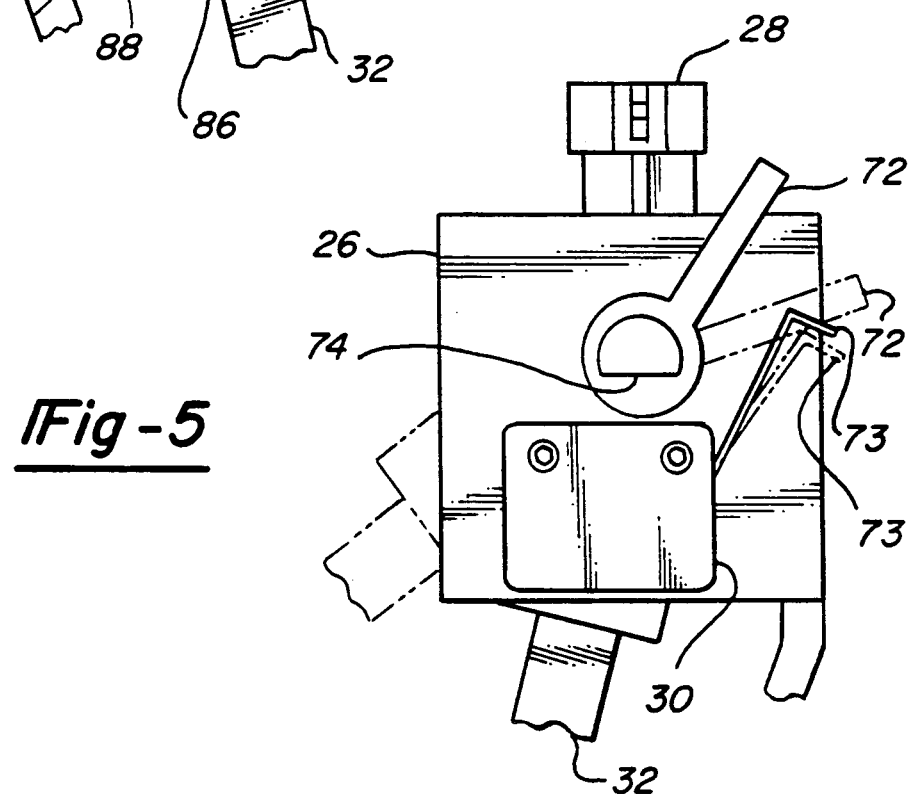
FIG. 5 is a side elevation view of the top portion of the accelerator pedal assembly illustrating the actuation of the idle validation switch in accordance with the present invention.

Looking particularly at FIGS. 3, 4 and 5, the housing portion 26 of the base bracket member is adapted to retain a rotary potentiometer 28 on the outboard side of one wall member 40 and an idle validation switch 30 on the outboard side of the other wall 42. Each of the walls is bored along a lateral axis to support a rotary input shaft 70 on bearings 80. Suitable means are provided on the shaft 70 for keying it to the rotary input shaft of the rotary potentiometer 28, and to the oscillating follower member 32 and to an actuating lever 72 located in proximity to the idle validation switch and adapted to engage a trip lever 73 when in the idle position. For this purpose, the rotary shaft can be flattened throughout its length on a minor arc portion of its circumference as shown at 74 in FIGS. 4 and 5. In this way, the shaft is keyed to the follower member 32 and actuating lever 72, each of which includes a correspondingly shaped slot 76 and 78, respectively. Likewise, bearings 80 which support the input shaft on walls 40,42 include an inner race member 82 having a correspondingly shaped slot 84.

The manner in which the input shaft 70 is keyed to the potentiometer 28 is explained below in connection with FIGS. 7 and 8.

The oscillating follower member 32 is located within the housing portion 26 and is supported by and adapted to pivot about the rotary shaft 70. The follower member includes a laterally extending stop member 86.

As seen best in FIG. 4, the follower member 32 is adapted to be biased by a torsion coil spring 88 in a position shown in phantom line in FIG. 4 which represents the idle position of the accelerator pedal. The stop member 86 will abut at both walls with stop shoulders 48,50 formed in flanges 44 and 46, respectively. The preferred coil spring as seen in FIG. 3 is known as a "hairpin" spring. It includes an intermediate portion 90 between respective coils 92,94 and ends 96,98. It functions as a dual spring. If one-half should break, the remaining half provides a back-up and continues to function. As seen, the coil spring is adapted to bear against the housing portion at intermediate portion 36 and against the stop member 86 at its ends 96,98.

At its opposite end, the oscillating follower member 32 includes a pin 100 having a roller 66 rotationally mounted thereon. The pin rides within an arcuate slot 68 formed in the flange portion 60. It is held within the slot by any suitable means such as washer 106 and cotter pin 108 as shown.

As noted below, the securing of pin 100 within slot 68 also serves to preclude undesirable spring back of the accelerator pedal 22 when the operator may abruptly release the pedal. Thus, the pedal 22 is restrained to traverse only the arc designated 116 in FIG. 1 between the idle and wide open throttle positions. At the same time, the roller 66 will bear against the cam surface 62 of the accelerator pedal member.

It will be noted that the rotary potentiometer 28 is securely fixed to the housing portion 26. Thus, regardless of the movement of the accelerator pedal, the rotary potentiometer will remain fixed in position. The wire 110 which transmits the electrical output of the potentiometer to a control means (not shown), will likewise remain in a fixed position. Thus, the entire electrical wiring assembly from the potentiometer 28 to the main wiring harness 112 within the dash support structure 114 as seen in FIG. 1 will remain in a stationary position and be free from chafing and other conditions causing wear and premature failure.

As an optional feature, the accelerator pedal can include a secondary pedal blade 120 fixed to the underside of the accelerator pedal and extending through a portion of the base bracket member and the floor pan at an opening 122 to a terminal position outside the vehicle cab. At its opposite end, the secondary pedal blade can be affixed to a control rod 124. Upon actuation of the pedal from the idle position as shown in solid line in FIG. 1 to the wide-open-throttle position as represented in phantom line in FIG. 1, the secondary pedal blade will translate the control rod 124 over an axial travel path indicated at 126. The control rod 124 as controlled by the secondary pedal blade can either operate or be operated by mechanism components outside the vehicle cab, e.g., mechanically modulated automatic transmissions.

In FIGS. 6-8, there is shown an alternative embodiment to the accelerator pedal assembly.

The accelerator pedal assembly 200 includes same basic components, namely, an accelerator pedal 210, a base bracket member 212 having a housing portion 214 with a rotary potentiometer 216 and idle validation switch 218 mounted thereon, and a spring biased follower member 220 rotatably supported on a potentiometer input shaft 222 at one end and coupled to the accelerator pedal 210 at its other end.

The accelerator pedal 210 has a single rubber covered plate member 224 having a hinge 226 at its lower end and a coupling member 228 at its upper end. Laterally extending plate portion 230 includes a cam surface 232 at its underside. However, unlike the embodiments shown in FIGS. 1-5, the cam surface is flat rather than arcuate, and the slot 234 is linear rather than arcuate. With the present arrangement, the deviation in the rotation of the follower member 220 as a linear relationship to the rotation of accelerator pedal 210 is electronically adjusted by a suitable control circuit.

The base bracket member 212 comprises a lower portion 236 formed as a stamping and an upper portion 238 formed as a casting. The two members, may be secured to one another by the same bolt 240 securing the assembly to the toe board. Secured to the lower member 236 at the intermediate portion of the base bracket member is a stop member 242 in the form of a threaded bolt 244 having a rubber head 246 and threadingly received within nut member 248 which is affixed to the lower member 236. The height of stop member 242 may be adjusted by turning it relative to the nut 248.

Looking at the housing portion 214, the potentiometer 216 is secured to the outboard side of wall 250 thereof while the idle validation switch 218 is secured on the interior side of the same wall 250.

As shown particularly in FIGS. 7 and 8, the input shaft 222 is received within the potentiometer 216 and includes an elongated, rectangularly cross-sectioned tab 252 at its end. The tab is designed to slidingly interfit within a slot 256 formed by oppositely disposed quadrant sectors 258 on the input member of the potentiometer. Each quadrant sector 258 has a driving face 260. Between the quadrant sectors is an open quadrant section 262. In operation, the input member 264 is driven in the direction of the arrow as the pedal moves from the idle position to the wide open throttle position. The driven input member is spring biased in a direction opposite that of the arrow. As a safety feature, should the input member 264 fail to return to the idle position, the open quadrant section 262 will allow the input shaft 222 to rotate 90°, which is sufficient to allow it to return to the idle position, thereby precluding what might otherwise be a possibility that the input shaft and thus the accelerator pedal assembly, would be held in an open throttle position. Thus, the accelerator pedal assembly remains operational. The idle validation switch will indicate &hat the accelerator pedal is in the idle position whereas the potentiometer will indicate that it is in an open throttle position, thus indicating to the computerized control (not shown) that there is a malfunction or a concern to be acted upon.

The follower member 220 comprises a pair of arms 266 and 268. Each is connected to the other as a rigid structure by pins 270. At one end of the follower members, there is provided a cam follower in the form of a roller 272 rotatably mounted on a pin 274 which extends through the slot 234 of accelerator pedal flange 230. The cam follower bears against cam surface 232 in the same manner as described previously in connection with the embodiment shown in FIGS. 1-5.

The follower member 220 is spring biased by torsion coil spring 276 in the idle position as shown in solid line in FIG. 6. For purposes of clarity, the spring 276 is omitted from FIG. 7. A pin 278 extends from wall 250 to wall 280 of the housing and acts as a stop member against which the top side of the arms 266,268 will bear as seen in FIG. 6. One arm member 266 includes at its opposite end an elongated actuating lever 280 which engages the idle validation switch in the same manner as lever 72 of the earlier described embodiment.

Other than the foregoing, the embodiment shown in FIGS. 6-8 is the same as that shown in the earlier described embodiment and the operation is also the same as that to be described in connection with the first embodiment.

In operation, the driver applies pressure to the pedal 22 and forces it against the bias of spring 88 towards wide-open-throttle to accelerate, then releases the pressure to allow the pedal to return toward idle, causing the vehicle to slow down. As the driver pushes the pedal down, the cam surface 62 forces rotation of the cam follower 66 and the follower member 32 to which it is pinned. When the driver removes the pedal pressure, the follower member 32, being spring loaded, rotates back to the idle position, forcing the pedal back to its idle position. Each oscillation of the follower member causes rotation of the potentiometer input shaft 70 which drives the electrical pedal position indicating components 28 and 30 of the assembly.

Rotation of the input shaft 70 rotates the resistive element of the potentiometer, varying the output voltage level. The computer then reads the voltage level, compares this with stored information correlating voltage level and pedal position, and determines the pedal position.

The design of most software logic requires the use of an idle validation switch 30. The switch is actuated by trip lever 73 on the rotating input shaft 70 as the pedal leaves or returns to the idle position. The changing state of the switch is monitored by the computer, and compared to the signal from the potentiometer. This comparison is used as a protective measure against potentiometer malfunction.

Torsion spring 88 returns the pedal back to the idle position and provides resistance to the pressure exerted by the driver's foot. When the operator reduces the pedal force, the torque from the spring acting on the follower member 32 rotates the follower and pedal back to idle. The spring provides a resistance to pedal rotation by pushing the pedal back against the driver's foot. This resistance increases as the pedal rotates towards side open throttle position requiring the driver to apply an increasing amount of pedal effort.

The motion of the pedal is constrained at the wide open throttle position and the idle position by the base bracket member 20. When the pedal reaches the wide open throttle position, it is halted by the wide open throttle stop 38 which will support any additional force the operator applies without allowing further pedal rotation. As the follower returns, its motion is halted by the idle stop 86 on the base bracket housing portion 26. Since the cam follower is connected to the pedal by pin 100, the follower member 32 prevents the pedal from going past the idle position when the follower member 32 is stopped.

Throughout operation, the electrical components 28 and 30 are elevated from and isolated from the travel path or environmental area of the accelerator pedal and thus remain free of contamination by dirt, moisture and the like. Since the upper housing portion 26 remains rigid throughout pedal operation and is otherwise removed from it, the potentiometer output wire 110 remains perfectly stationary and is not subject to chafing and wear.

While the best mode for carrying out the invention has been described in detail, those familiar with the art to which this invention relates will recognize alternative designs and embodiments for practicing the invention as defined by the following claims.

We claim:

1. An accelerator pedal assembly adapted to be installed as a completely assembled and pre-adjusted assembly onto the floor of a vehicle cab comprising:
   a base bracket member;
   a housing portion carried by said base bracket member at one end thereof;
   an elongate accelerator pedal rotatably secured to said base bracket member at the opposite end thereof;
   electronic means secured to said housing portion for producing an electrically generated output signal in proportion to the location of said accelerator pedal in any position from an idle position to the wide open throttle position;
   follower means secured to and extending between said accelerator pedal and said electronic means;
   said housing portion being supported by said base bracket member in an elevated position located above the upper extremities of said accelerator pedal, whereby the electronic means will be free of particulates or other contaminants commonly carried by the accelerator pedal or otherwise transferred to the pedal assembly by the operator;
   said electronic means including a rotary potentiometer having a rotary input shaft extending laterally of said base bracket member and said accelerator pedal; and
   said follower means including an arm member fixedly coupled at one end to said rotary input shaft and slidingly coupled at the opposite end thereof to said accelerator pedal.

2. The invention as defined in claim 1 wherein said base bracket member includes a generally vertical section at said one end and a generally horizontal section at said opposite end;
   said base bracket member further including a raised stop means for limiting the travel of said accelerator pedal to a set position representing wide open throttle.

3. The invention as defined in claim 1 wherein said housing portion includes a pair of laterally spaced wall members extending radially outwardly from the base bracket member in the direction of said accelerator pedal;
   a rotary shaft member extending between said wall members and supported by said wall members, said rotary shaft member having opposed end portions which laterally extend beyond said wall members;
   said rotary potentiometer being secured to one said wall member and coupled to one end of said rotary shaft member; and
   an idle validation switch means being secured to one said wall member, said rotary shaft member carrying trip means to activate said idle validation switch means only when said acceleration pedal is in said idle position.

4. The invention of claim 3 wherein said potentiometer includes a driven member operatively engaged by said input shaft, said driven member including means for allowing said input shaft to return to said idle position while said driven member may remain in another position.

5. The invention of claim 3 wherein said housing portion includes spring means for biasing said follower means in the idle position of said accelerator pedal.

6. The invention as defined in claim 5 wherein said follower means includes a stop member extending transversely of said arm member;
   each said wall member carrying a stop shoulder;
   said stop member being biased into engagement with said stop shoulders by said spring means when said accelerator pedal is in the idle position.

7. An accelerator pedal assembly adapted to be installed as a completely assembled and preadjusted assembly onto the floor of a vehicle cab comprising:
   a base bracket member;
   a housing portion carried by said base bracket member at one end thereof;
   an elongate accelerator pedal rotatably secured to said base bracket member at the opposite end thereof;
   electronic mans secured to said housing portion for producing an electrically generated output signal in proportion to the location of said accelerator pedal in any position from an idle position to the wide open throttle position;
   follower means secured to and extending between said accelerator pedal and said electronic means;
   said housing portion being supported by said base bracket member in an elevated position located above the upper extremities of said accelerator pedal, whereby the electronic means will be free of particulates or other contaminants commonly carried by the accelerator pedal or otherwise transferred to the pedal assembly by the operator;
   said accelerator pedal being secured at one end to said base bracket member by a hinge having an axis extending laterally of said base bracket member, and being biased in an uppermost position representing the idle position of said accelerator pedal; and
   said electronic means including a rotary potentiometer having an input shaft with an axis disposed laterally of said base bracket member;
   said follower means being coupled to said input shaft and adapted to oscillate about said input shaft axis between one position representing the idle position of said accelerator pedal and a second position representing the wide open throttle position of said accelerator pedal; and
   said follower means being fixed to the free end of said accelerator pedal by a jointly radiating coupling means for providing linearly proportionate travel between said follower means and said accelerator pedal, whereby a specific degree of accelerator pedal travel at any and every pedal position between idle and wide open throttle will cause a specific degree of oscillation in said follower means and thus a constant electrical output from said potentiometer regardless of the specific pedal position of said accelerator pedal.

8. The invention of claim 7 wherein said potentiometer includes a driven member operatively engaged by said input shaft, said driven member including means for allowing said input shaft to return to said one position while said driven member may remain in said second position.

9. The invention of claim 7 wherein said jointly radiating coupling means comprises a cam surface portion located on one of said follower means and accelerator pedal and a cam follower being located on the other of said follower means and accelerator pedal;
- said follower means being slidingly connected to and in constant engagement with said cam surface portion;
- said cam surface being generally curved about said lateral axis in a path providing said linearly proportionate travel.

10. An accelerator pedal assembly adapted to be installed as a completely assembled and pre-adjusted assembly onto the floor of a vehicle cab comprising:
- a base bracket member;
- a housing portion carried by said base bracket member at one end thereof;
- an elongate accelerator pedal rotatably secured to said base bracket member at the opposite end thereof;
- electronic means secured to said housing portion for producing an electrically generated output signal in proportion to the location of said accelerator pedal in any position from an idle position to the wide open throttle position;
- follower means secured to and extending between said accelerator pedal and said electronic means;
- said housing portion being supported by said base bracket member in an elevated position located above the upper extremities of said accelerator pedal, whereby the electronic means will be free of particulates or other contaminants commonly carried by the accelerator pedal or otherwise transferred to the pedal assembly by the operator; and
- said accelerator pedal including a secondary pedal blade member extending from the underside thereof in the direction of said base bracket member to a position substantially beyond said base bracket member whereby the accelerator pedal may be controlled by or controlled through the secondary pedal blade member outside the vehicle cab.

11. An accelerator pedal assembly adapted to be installed as a completely assembled and pre-adjusted assembly onto the floor of a vehicle cab comprising:
- a base bracket member;
- a housing portion carried by said base bracket member at one end thereof;
- an elongate accelerator pedal rotatably secured to said base bracket member at the opposite end thereof;
- electronic means secured to said housing portion for producing an electrically generated output signal in proportion to the location of said accelerator pedal in any position from an idle position to the wide open throttle position;
- follower means secured to and extending between said accelerator pedal and said electronic means;
- said housing portion being supported by said base bracket member in an elevated position located above the upper extremities of said accelerator pedal, whereby the electronic means will be free of particulates or other contaminants commonly carried by the accelerator pedal or otherwise transferred to the pedal assembly by the operator; and
- said housing portion remaining rigidly fixed in a single position throughout the operational extent of said accelerator pedal, said electronic means including electrical wiring extended therefrom for transmitting the output of said electronic means, said electrical writing remaining in fixed position relative to said housing portion.

* * * * *